(12) United States Patent
Ra et al.

(10) Patent No.: US 11,750,291 B2
(45) Date of Patent: Sep. 5, 2023

(54) PON SLICING METHOD AND DEVICE USING NETWORK SHARING

(71) Applicant: ELECTRONICS AND TELECOMMUNICATIONS RESEARCH INSTITUTE, Daejeon (KR)

(72) Inventors: YongWook Ra, Daejeon (KR); Chansung Park, Sejong-si (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 34 days.

(21) Appl. No.: 17/517,778

(22) Filed: Nov. 3, 2021

(65) Prior Publication Data
US 2022/0286206 A1 Sep. 8, 2022

(30) Foreign Application Priority Data
Mar. 2, 2021 (KR) .................. 10-2021-0027302

(51) Int. Cl.
*H04B 10/27* (2013.01)
*H04J 14/02* (2006.01)
*H04Q 11/00* (2006.01)

(52) U.S. Cl.
CPC .......... *H04B 10/27* (2013.01); *H04J 14/0224* (2013.01); *H04J 14/0227* (2013.01); *H04Q 11/0067* (2013.01); *H04Q 2011/0064* (2013.01); *H04Q 2011/0086* (2013.01)

(58) Field of Classification Search
None
See application file for complete search history.

(56) References Cited

U.S. PATENT DOCUMENTS

| 9,219,567 | B2 | 12/2015 | Kim et al. |
| 9,246,628 | B2 | 1/2016 | Cho et al. |
| 2019/0215243 | A1 | 7/2019 | Wang et al. |

(Continued)

FOREIGN PATENT DOCUMENTS

| CN | 108282708 | * | 7/2018 | ............. H04Q 11/00 |
| CN | 111464890 | * | 8/2021 | ............. H04Q 11/00 |

(Continued)

OTHER PUBLICATIONS

Wang et al: "Network Service Slicing Supporting Ubiquitous Access in Passive Optical Networks", ICTON 2018, We.P.9, pp. 1-3 (Year: 2018).*

(Continued)

*Primary Examiner* — Li Liu
(74) *Attorney, Agent, or Firm* — LRK PATENT LAW FIRM

(57) ABSTRACT

A passive optical network (PON) method and device using network sharing are disclosed. The PON slicing method includes identifying network elements included in a plurality of physical PONs (pPONs), abstracting the identified network elements to be recognized as a same software block, generating a plurality of virtual PONs (vPONs) according to a user requirement using the plurality of pPONs, and mapping the generated plurality of vPONs by performing PON slicing on the abstracted network elements.

9 Claims, 13 Drawing Sheets

(56) References Cited

U.S. PATENT DOCUMENTS

2020/0204261 A1  6/2020  Zhang et al.
2021/0352385 A1* 11/2021  Thollabandi ........ H04J 14/0238

FOREIGN PATENT DOCUMENTS

EP       3873102      * 9/2019  ............. H04Q 11/00
KR   10-2017-0114923 A   10/2017

OTHER PUBLICATIONS

Sparks et al: "5G Network Slicing Whitepaper" (https://transition.fcc.gov/bureaus/oet/tac/tacdocs/reports/2018/5G-Network-Slicing-Whitepaper-Finalv80.pdf) (Year: 2020).*

* cited by examiner

PON SLICING METHOD AND DEVICE USING NETWORK SHARING

CROSS-REFERENCE TO RELATED APPLICATION

This application claims the benefit of Korean Patent Application No. 10-2021-0027302 filed on Mar. 2, 2021, in the Korean Intellectual Property Office, the entire disclosure of which is incorporated herein by reference for all purposes.

BACKGROUND

1. Field of the Invention

One or more example embodiments relate to a passive optical network (PON) slicing method and device using network sharing, and more specifically, to a method and device for classifying network elements of an optical access network into a data plane and a control plane, and controlling and managing the optical access network as one logical equipment through centralized integrated control.

2. Description of Related Art

In order to accommodate explosive data traffic, for today's optical access network, it is being considered to introduce an optical access network technology with characteristics of being free from hardware dependence, easy to expand, and flexible in providing network functions. However, a conventional optical access network equipment has a control plane (configured with software) that performs functions of management and control and a data plane (configured with hardware) including a layer 2 function and a layer 1 function, the data plane that performs a function of providing a data path for traffic. The conventional optical access network equipment with the integrated control plane and data plane is implemented as an object-oriented fixed-function device. Therefore, there are limitations on the replacement and addition of new functions in the optical access network equipment. Even when subscriber services are provided in the same region, there is a short-coming in that CAPEX/OPEX costs increase due to an independent private network established for each service provider (SP).

In addition, using network sharing, even when multiple SPs provide different services by sharing one optical access network equipment, the fixed-function device with the integrated control plane and data plane have short-comings in that there are still limitations due to capacity expansion issues and various access technologies (GPON, XGS-PON, NG-PON2, and the like) of equipment, and the management and operation of optical access networks is complicated.

SUMMARY

Example embodiments provide a method and device for managing a physical network resource in which physical dependency of an equipment for each vendor is eliminated through abstraction of network elements in an optical access network in which the network elements that are integrated into a fixed-function device are divided into a data plane and a control plane, and the optical access network is controlled and managed as a logical equipment through centralized integrated control, thereby establishing a network architecture in a rapid, flexible, and cost-effective manner.

In addition, example embodiments provide a method and device in which an optical access network is controlled and managed as one logical equipment by performing centralized integrated control in the optical access network, and service providers (SPs) who have established a conventional private network are able to share physical network resources of the optical access network by logically redistributing each resource.

In addition, example embodiments provide a method and device in which physical network resources of an optical access network are reconfigured as software-based logical resources, thereby flexibly managing a network through independent control and service division according to a service type defined by a user.

In addition, example embodiments provide a method and device in which a plurality of virtual passive optical networks (vPONs) are established by abstracting physical network resources of an optical access network and implementing a network function for the abstracted physical network resources on a control plane to reconfigure and redistribute the resources as a logical switch, and a PON slicing (inter-PON or intra-PON) method is provided for each service by enabling N:M matching of the plurality of vPONs and a plurality of physical PONs (pPONs).

According to an aspect, there is provided a PON slicing method including identifying network elements included in a plurality of pPONs, abstracting the identified network elements to be recognized as a same software (SW) block, generating a plurality of vPONs according to a user requirement using the plurality of pPONs, and mapping the generated plurality of vPONs by performing PON slicing on the abstracted network elements.

The PON slicing method may further include classifying the identified network elements included in the plurality of pPONs into a data plane and a control plane.

The generating may include generating a plurality of vPONs on the control plane by reconfiguring the abstracted plurality of network elements for each SP or each service type provided by the SP.

The PON slicing method may further include transmitting and receiving data through network elements on the data plane mapped to correspond to the generated plurality of vPONs.

The transmitting and receiving may include allocating a bandwidth (BW) to the plurality of vPONs using different BW allocation schemes for each SP or each service type provided by the SP according to a user requirement using the plurality of vPONs.

The plurality of pPONs and the plurality of vPONs may be matched in N:M, and N and M may be equal or different from each other.

According to another aspect, there is provided a PON slicing device that performs a PON slicing method, the PON slicing device including a processor. The processor may be configured to identify network elements included in a plurality of pPONs, abstract the identified network elements to be recognized as a same SW block, generate a plurality of vPONs according to a user requirement using the plurality of pPONs, and map the generated plurality of vPONs by performing PON slicing on the abstracted network elements.

The processor may be configured to classify the identified network elements included in the plurality of pPONs into a data plane and a control plane.

The processor may be configured to generate a plurality of vPONs on the control plane by reconfiguring the abstracted plurality of network elements for each SP or each service type provided by the SP.

The processor may be configured to transmit and receive data through network elements on the data plane mapped to correspond to the generated plurality of vPONs.

The processor may be configured to allocate a BW to the plurality of vPONs using different bandwidth allocation schemes for each SP or each service type provided by the SP according to a user requirement using the plurality of vPONs.

The plurality of pPONs and the plurality of vPONs may be matched in N:M, and N and M may be equal or different from each other.

According to still another aspect, there is provided a PON slicing device that performs a PON slicing method, the PON slicing device including a control plane unit configured to classify network elements included in a plurality of pPONs into a data plane and a control plane, and generate a plurality of vPONs by performing PON slicing for each SP or each service type provided by the SP so as to control and manage an optical access network as one logical equipment through centralized integrated control, a data plane unit configured to provide a path for a transmission and reception packet corresponding to the plurality of vPONs by logically classifying the network elements included in the plurality of pPONs for each SP or each service type provided by the SP through PON slicing performed by the control plane unit, and a service orchestration unit configured to provide a function of setting and managing a physical OLT (pOLT) and a physical ONU (pONU) existing in the optical access network by managing an overall service through interworking with an external operational support system (OSS) function, and adjusting a virtualized function for each PON slicing.

The control plane unit may be configured to abstract the network elements included in the plurality of pPONs, and generate a plurality of vPONs on the control plane by reconfiguring the abstracted plurality of network elements for each SP or each service type provided by the SP.

The control plane unit may be configured to allocate a BW to the plurality of vPONs using different BW allocation schemes for each SP or each service type provided by the SP according to a user requirement using the plurality of vPONs.

The plurality of pPONs and the plurality of vPONs may be matched in N:M, and N and M may be equal or different from each other.

Additional aspects of example embodiments will be set forth in part in the description which follows and, in part, will be apparent from the description, or may be learned by practice of the disclosure.

According to example embodiments, physical dependency of an equipment for each vendor may be eliminated through abstraction of network elements in an optical access network in which the network elements that are integrated into a fixed-function device are classified into a data plane and a control plane, and the optical access network may be controlled and managed as a logical equipment through centralized integrated control, thereby establishing a network architecture in a rapid, flexible, and cost-effective manner.

In addition, according to example embodiments, an optical access network may be controlled and managed as one logical equipment by performing centralized integrated control in the optical access network, and SPs who have established a conventional private network may share physical network resources of the optical access network by logically redistributing each resource.

In addition, according to example embodiments, physical network resources of an optical access network may be reconfigured as software-based logical resources, thereby flexibly managing a network through independent control and service division according to a service type defined by a user.

In addition, according to example embodiments, a plurality of vPONs may be established by abstracting physical network resources of an optical access network and implementing a network function for the abstracted physical network resources on a control plane to reconfigure and redistribute the resources as a logical switch, and a PON slicing (inter-PON or intra-PON) method may be provided for each service by enabling N:M matching of the plurality of vPONs and a plurality of pPONs.

In addition, according to example embodiments, a plurality of vPONs may be established through PON slicing, and various BW allocation schemes may be selectively controlled for each service to meet a user requirement in the vPONs, thereby providing an optical access infrastructure for providing a mobile service as well as a wired service (residential service or business service).

According to an aspect, there is provided a PON slicing method including configuring PON slices with parameters; setting parameters for multiple dynamic bandwidth allocation (DBA) for an optical line terminal (OLT); and setting the DBA for each PON slices.

BRIEF DESCRIPTION OF THE DRAWINGS

These and/or other aspects, features, and advantages of the invention will become apparent and more readily appreciated from the following description of example embodiments, taken in conjunction with the accompanying drawings of which.

DETAILED DESCRIPTION

Hereinafter, example embodiments will be described in detail with reference to the accompanying drawings.

Figure 1:
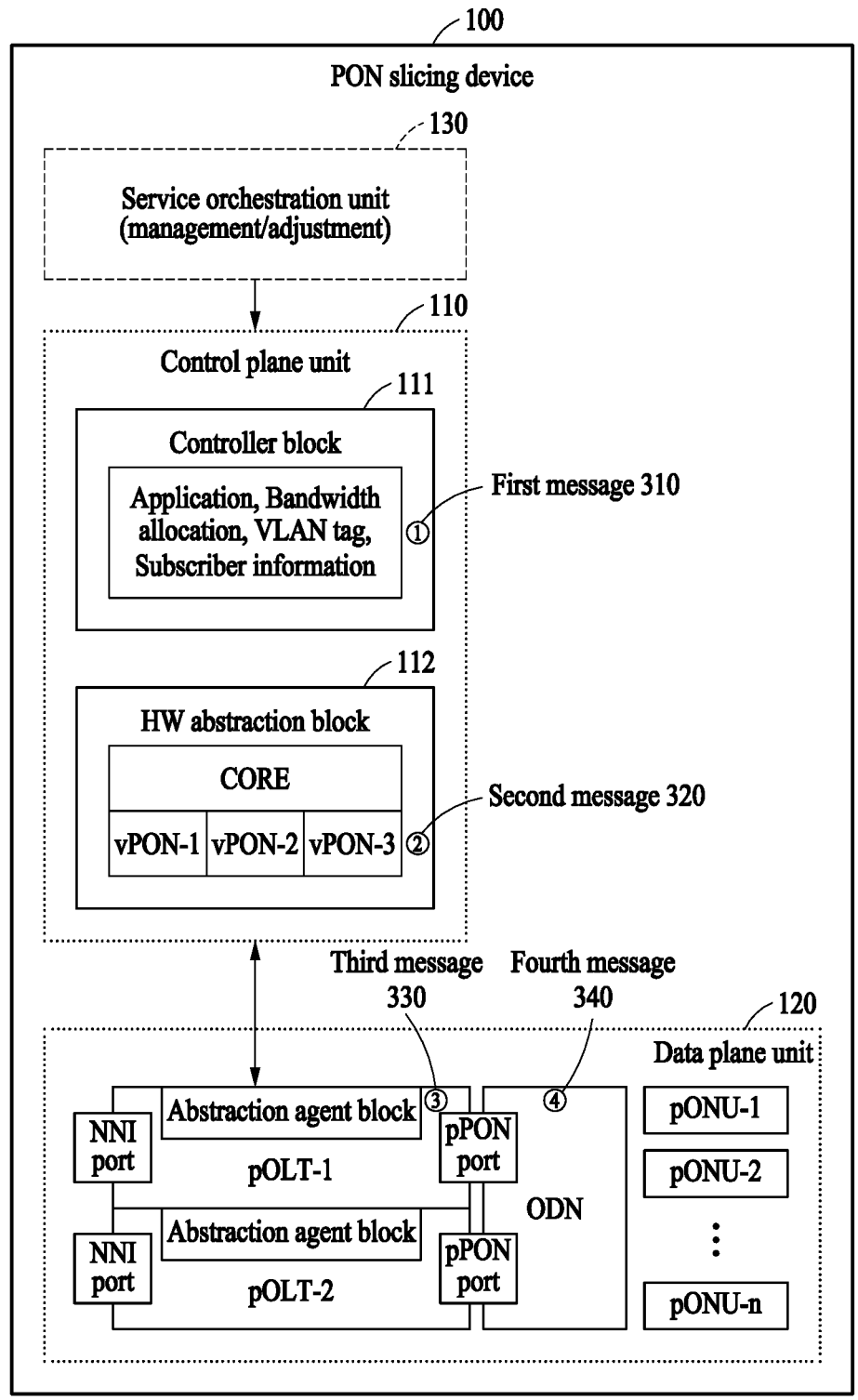
FIG. 1 is a diagram illustrating a conceptual diagram of a passive optical network (PON) slicing device according to an example embodiment.

FIG. 1 is a diagram illustrating a conceptual diagram of a passive optical network (PON) slicing device according to an example embodiment.

For example, FIG. 1 illustrates a conceptual diagram of PON slicing for providing a service by dividing two physical OLTs (pOLTs) and N physical ONUs (pONUs) included in a physical PON (pPON) into three virtual PONs (vPONs). However, structures of the pPON and the virtual PONs is not limited to the above-described example, and may exist in various ways.

Referring to FIG. 1, a PON slicing device 100 according to an example embodiment may include a control plane unit 110, a data plane unit 120, and a service orchestration unit 130. The PON slicing device 100 may classify network elements included in the pPON into a data plane and a control plane, and the control plane unit 110 may perform PON slicing for each SP or each service type provided by the SP so that an optical access network is controlled and managed as one logical equipment through centralized integrated control.

The data plane unit 120 may logically classify the network elements of the pPON for each service provider (SP) or each service type provided by the SP through PON slicing performed by the control plane unit 110, thereby providing a path for a transmission and reception packet.

The service orchestration unit 130 may manage an overall service through interworking with an external operational support system (OSS) function, and may adjust a virtualized function for each PON slicing, thereby providing a function of setting and managing a pOLT and a pONU existing in the optical access network.

More specifically, the control plane unit 110 may include a controller block 111 and a hardware (HW) abstraction block 112, and the data plane unit 120 may include a plurality of pOLTs, a plurality of pONUs, and an optical distribution network (ODN).

In this case, network elements included in the plurality of pPONs may be abstracted by the HW abstraction block 112, and the controller block 111 may manage in view of the optical access network based on the abstracted physical information. In addition, the controller block 111 may define virtual network functions (VNFs), and may set and manage various application components (for example, PON management, DHCP, multicast, AAA, and the like) and the VNFs so that the optical access network is PON sliced for each service type such as a subscriber authentication procedure state machine applicable to a corresponding virtual network, VLAN management for each subscriber, dynamic bandwidth allocation (DBA), or the like. In this case, the controller block 111 may control all network elements of the optical access network including an aggregation switch through a combination of the application components, and may perform various management functions for operating the optical access network.

The HW abstraction block 112 may abstract the pPON as a simple logical switch so that the controller block 111 recognizes an actual pPON equipment as a same software (SW) block, thereby minimizing HW dependence and providing a function of hiding and managing PON level details (T-CONT, GEM, OMCI, scheduling policy, and the like).

More specifically, the HW abstraction block 112 may include a core function and a vPON function, and the core function of the HW abstraction block 112, which is a core function for PON management, may include a key/value (K/V) storage that performs a role of storing and managing setting and state information of a pPON device. The core function may perform a role of analyzing a message received from each interface including the controller block 111 and the pPON in the data plane unit 120, executing a logic to process the message, generating an execution result as a new message, and then forwarding the new massage back to each interface.

The core function may manage vPONs that perform logical mapping on the pPON (pOLT and pONU) as one logical switch, and may divide flow setting requests received from the controller block 111 for each of devices of corresponding pPONs mapped to respective vPONs, and then may perform a flow setting function required for each device.

The vPON function of the HW abstraction block 112 may perform a pPON adaptation function by opening an interface so as to reduce dependence on equipment of various vendors. A pOLT/pONU adapter included in the vPON function may perform a communication function with each pOLT and pONU included in the pPON, and may configure an interface message suitable for each pOLT and pONU to transmit corresponding setting information.

Respective adapters of the vPON function may exchange information through the core function of the HW abstraction block 112 and a message bus (for example, KAFKA), and communication between respective adapters may also exchange information through the message bus. The pONU adapter in the vPON function may generate an ONU management control interface (OMCI) message for each pONU setting, and may transmit the OMCI message to a pOLT connected to each pONU through the open interface by passing through the pOLT adapter through the message bus. In addition, the corresponding pOLT may transmit, to each pONU, the OMCI message received from the pOLT adapter through an OMCI channel.

The HW abstraction block 112 may also include a technology for abstracting an OMCI for managing standards for managing a management information base (MIB) between a pOLT and a pONU and a management control channel.

The HW abstraction block 112 with such a structure may configure settings of various attributes (for example, T-CONT, GEM port, scheduling policy, and discard policy) and flow settings transmitted from the controller block 111 differently according to characteristics of each SP (for example, a technology profile (TP) and a bandwidth profile (BP)) so as to configure a data path of the data plane unit 120. Furthermore, the HW abstraction block 112 may perform a role of appropriately dividing flow setting information received from the controller block 111 for each logical device to be managed, generating a combined message by merging attribute information and flow setting information of each logical device, and then setting a function required for a corresponding physical device (for example, pOLT or pONU).

The data plane unit 120 may include a plurality of pOLTs, a plurality of pONUs, and an ODN, and each pOLT may have the HW abstraction block 112 and an abstraction agent block with an open interface. The abstraction agent block of the data plane unit 120 may extract an HW attribute value required for setting the pOLT and pONU from the combined message received from the HW abstraction block 112. In addition, the abstraction agent block of the data plane unit 120 may extract information required for configuring a lookup table to discover a forwarding path for traffic and transmit the extracted information to a command line interface for physical PON HW setting, thereby setting a key value and a result value of a forwarding lookup table existing in the pOLT and the pONU. Furthermore, when SPs share one pOLT by performing division into the vPON function, a DBA scheme may be set differently when setting the pOLT and related pONU configuration according to service characteristics of the SPs, and a T-CONT for configuring an OMCI data path, a GEM port, a HW attribute such as a scheduling policy, and flow information may be set by subdividing each pOLT and pONU according to the divided vPON.

The PON slicing device 100 with such a structure may share resources of network elements included in the pPON by performing centralized integrated control to control and manage pOLTs of multiple vendors as one logical OLT, and redistribute logical resources. Thus, the SPs who have established a conventional private network may enable network sharing with respect to optical access network equipments.

Figure 2:
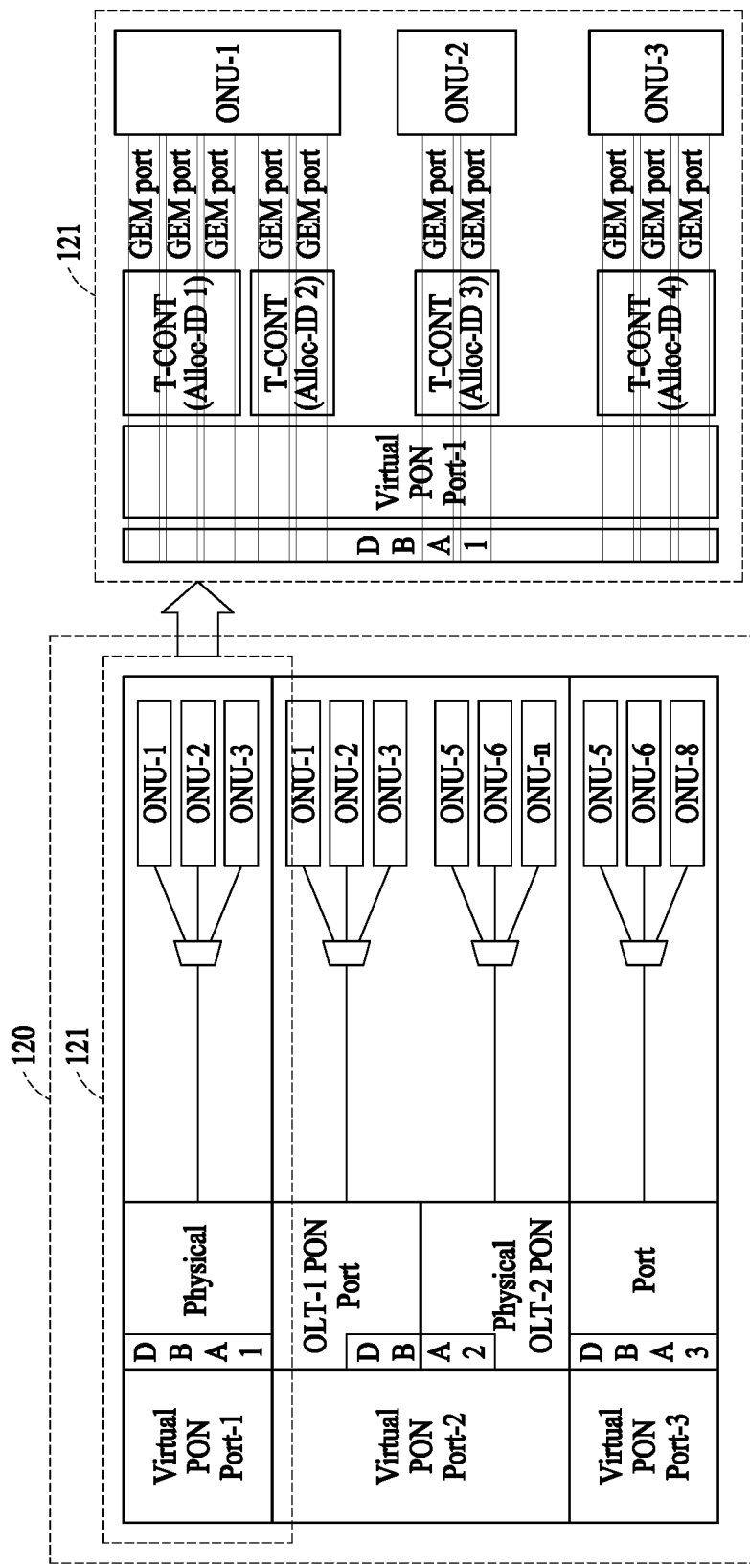
FIG. 2 is a diagram illustrating an example in which a PON slicing device maps a physical PON (pPON) of a data plane unit to a virtual PON (vPON) function of a hardware (HW) abstraction block according to an example embodiment.

FIG. 2 is a diagram illustrating an example in which a PON slicing device maps a pPON of a data plane unit to a vPON function of an HW abstraction block according to an example embodiment.

Referring to FIG. 2, the PON slicing device 100 may perform PON slicing on two pOLTs and N pONUs included in the data plane unit 120 to divide the two pOLTs and N pONUs into three vPON domains. FIG. 2 illustrates that a vPON domain is PON sliced according to the DBA scheme, and a vPON-1 domain 121 of the data plane unit 120 that is connected to the pOLT and includes ONU-1/2/3 shares the same PON port as that of ONU-2/3/4 of a vPON-2 domain. In the vPON-1 domain 121, a T-CONT may be identified by an alloc-ID, a GEM port may be identified by a GEM port ID, and the alloc-ID and the GEM port ID may have a unique value in all vPON domains.

Slicing may be performed for each SP by sharing a network-to-network interface (NNI) port, or slicing may be performed according to a DBA algorithm scheme of a service type (for example, a residential/business/mobile service) provided by the SP. In FIG. 2, allocation of the NNI port is sharable for each SP in a similar manner to a scheme of mapping a pPON port to a vPON port, and thus is not illustrated for ease of description.

As described above, the PON slicing device 100 may enable logical mapping of a vPON and a pPON to be performed in 1:1, and may enable logical mapping to be performed in N:M according to the DBA scheme.

Figure 3:
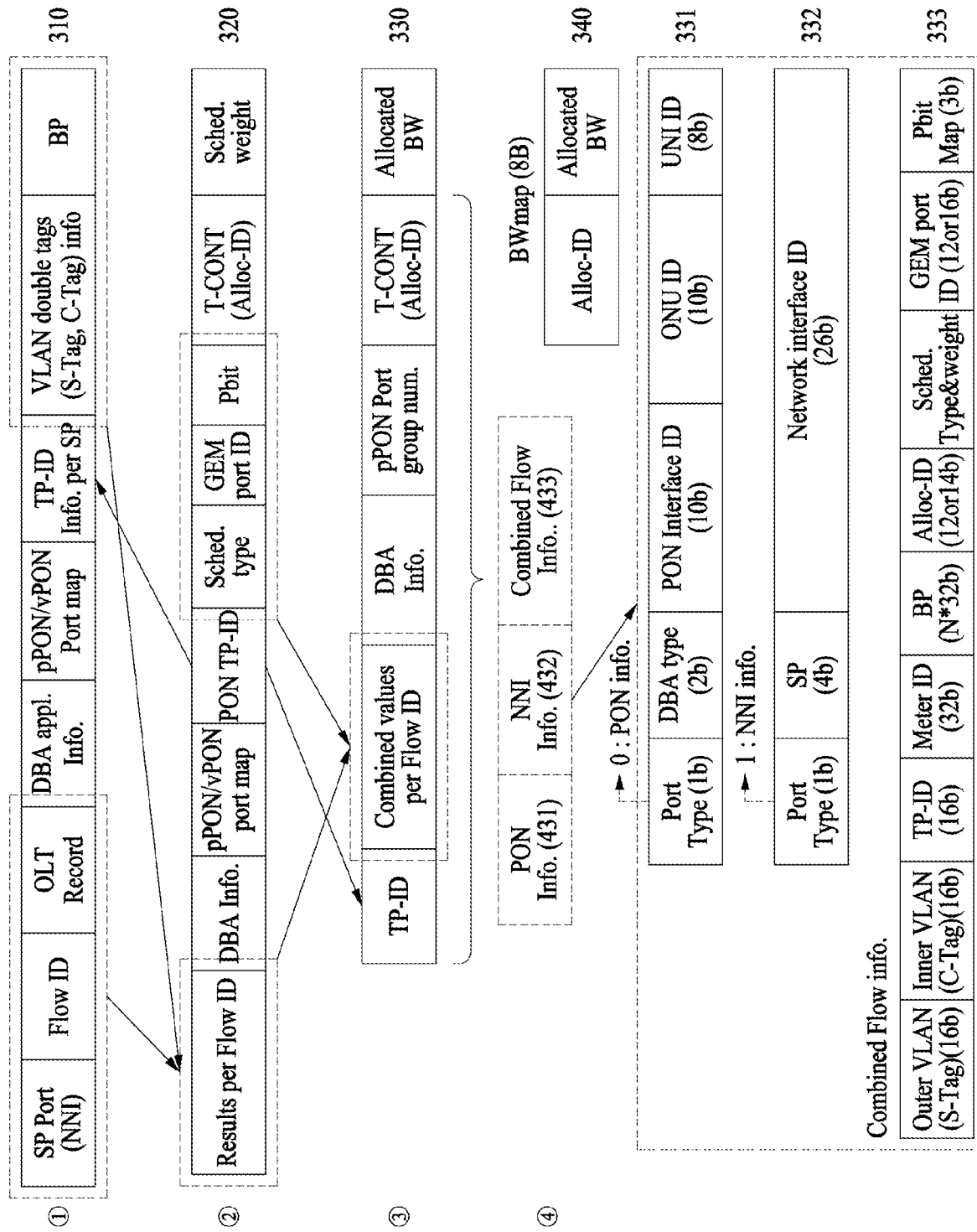
FIG. 3 is a diagram illustrating a detailed structure of an internal message and a transmission frame managed by a PON slicing device for each block according to an example embodiment.

FIG. 3 is a diagram illustrating a detailed structure of an internal message and a transmission frame managed by a PON slicing device for each block according to an example embodiment.

FIG. 3 illustrates a configuration of a first message 310 that is generated so that the controller block 111 in the control plane unit 110 transmits, to the HW abstraction block 112, setting information for each flow ID managed to provide a specific service of an optical access network included in a vPON for each SP. The flow ID may include a service profile record such as an SP, a service name provided for each service provider, and a service profile record such as a flow table ID. In addition, a subscriber ID may be mapped to a service profile ID.

In order to manage a service flow for each subscriber of a logical device through mapping of a pPON and a vPON, the first message 310 may include at least one of (i) an SP port (NNI) indicating NNI port information to which an SP or a service provided by the SP is allocated, (ii) a flow ID for identifying a subscriber flow, (iii) an OLT Record indicating slot/port information of an abstracted pOLT, (iv) DBA application information (DBA appl. Info.) selected for each service type provided, (v) a pPON/vPON port map field indicating port map information between the pPON and the vPON for port management of the logical device, (vi) a TP-ID info. per SP field with information on the number of T-CONTs and GEM ports that are allocated to a TP-ID to provide a service for each SP and set a future flow, (vii) a VLAN double tag field for identifying a subscriber through a C-tag and identifying a PON through an S-tag, and (viii) a BP field with information for bandwidth (BW) policing or shaping.

FIG. 3 illustrates a configuration of a second message 320 that is generated to divide a flow be suitable for a vPON after the core function in the HW abstraction block 112 parses information on a corresponding logical device in the first message 310 received from the controller block 111, to obtain flow information for each corresponding flow ID from a corresponding pPON, and to configure a data path and set flow information for the corresponding pPON of the data plane unit 120.

The HW abstraction block 112 may merge flow information for each flow ID obtained from the controller block 111 and TP information for configuring the data path of the data plane unit 120 (for example, a T-CONT, T-CONT priority queue allocation, a weight and discard policy, the number of GEM ports, P-bit mapping, a GEM port scheduling policy, and the like), and may store, in a key/value storage, information for setting a forwarding lookup table in the pPON.

SPs may select a TP with the same number of T-CONT and GEM ports. However, P-bit to GEM port mapping, an advanced encryption standard (AES), a scheduling policy, or discard policies may be set differently for each SP, which may require generation of multiple instances for the same TP.

However, a flow ID generated by the controller block 111 according to the generated multiple instances may need to be unique. The second message 320 may include at least one of (i) a field of results per flow ID with information allocated to the unique flow ID from the first message 310, (ii) DBA appl. info. selected for each service type provided (iii) a pPON/vPON port map field indicating port map information between a pPON and a vPON for port management of a logical device, (iv) a PON TP-ID field for setting an HW attribute for an individual TP-ID, (v) a scheduling type field, (vi) a GEM port ID field, (vii) a P-bit field, (viii) a T-CONT (alloc-ID) field, and (ix) a scheduling weight field.

In this case, specific pieces of information in the first message 310 and the second message 320 may be configured in a key and result format having the form of a lookup table.

FIG. 3 illustrates a configuration of a third message 330 that is generated so that the abstraction agent block of the data plane unit 120 parses combined flow information in the second message 320 received from the HW abstraction block 112 and extracts related pieces of information, and then sets DBA, a configuration such as a scheduling policy, and a forwarding lookup table in the pPON so as to forward data for each flow.

In order to transmit information on the generated third message 330 to a command line interface (CLI) for pPON HW setting, the abstraction agent block may generate messages 331, 332, and 333 with a BW map (8 bytes) field with an alloc-ID required for upstream BW setting from a pOLT to a pONU and allocated BW information, and pPON HW attribute information required for establishing a data path for each direction (upstream/downstream).

Message information of reference numeral 331 may include at least one of (i) a port type field for identifying whether it is a PON port or an NNI port, (ii) a DBA type field for identifying a DBA scheme, (iii) a PON interface ID field indicating a PON port ID when the port type field is "0", (iv) an ONU ID field, and (v) a user network interface (UNI) ID field.

Reference numeral 331 indicates a bit width of each field. However, reference numeral 331 merely indicates the bit width of each field based on G.9807.1 (XGS-PON) for ease of description, and the bit width of each field is not limited to a corresponding bit width. The length may vary according to a PON technology to be applied.

Message information of reference numeral 332 may include at least one of (i) a port type field for identifying whether it is a PON port or an NNI port, (ii) an SP ID field indicating SP ID information, and (iii) a network interface ID field indicating an NNI port ID when the port type field is "1".

Message information of reference numeral 333 may include at least one of (i) an S-tag field indicating outer VLAN tag information, (ii) a C-tag field indicating inner VLAN tag information, (iii) a TP-ID field indicating TP ID information, (iv) a meter ID field for ascertaining a parameter of BW polishing or shaping through a lookup table, (v) a BP field corresponding to the meter ID and indicating BP information, which is the parameter of BW polishing or shaping, (vi) an alloc-ID field, (vii) a scheduling type and weight field indicating scheduling type and scheduling weight information, (viii) a GEM port ID field, and (ix) a P-bit map indicating DSCP to P-bit mapping information, the P-bit map having a 3-bit with a total of 64 mapping structures.

Referring to FIG. 3, a fourth message 340 indicates a configuration of a BWmap field message in a G-PON transmission convergence (GTC) or XGTC frame generated during downstream transmission from a pOLT of data plane unit 120 to a pONU through an ODN. The BWmap field may apply all of BWmap (G.984.3(G-PON), G.987.3(XG-PON), G.9807.1(XGS-PON) standard) fields in the GTC or XGTC frame, and alloc-ID bit sizes (12-bit or 14-bit) and flag bit sizes (12-bit or 2-bit) of the BWmap may be different for each standard, but all BWmap sizes may be generated with a series of 8-byte allocation structures. The fields of respective standards described above are well-known technologies, and thus detailed descriptions thereof will be omitted.

Figure 4:
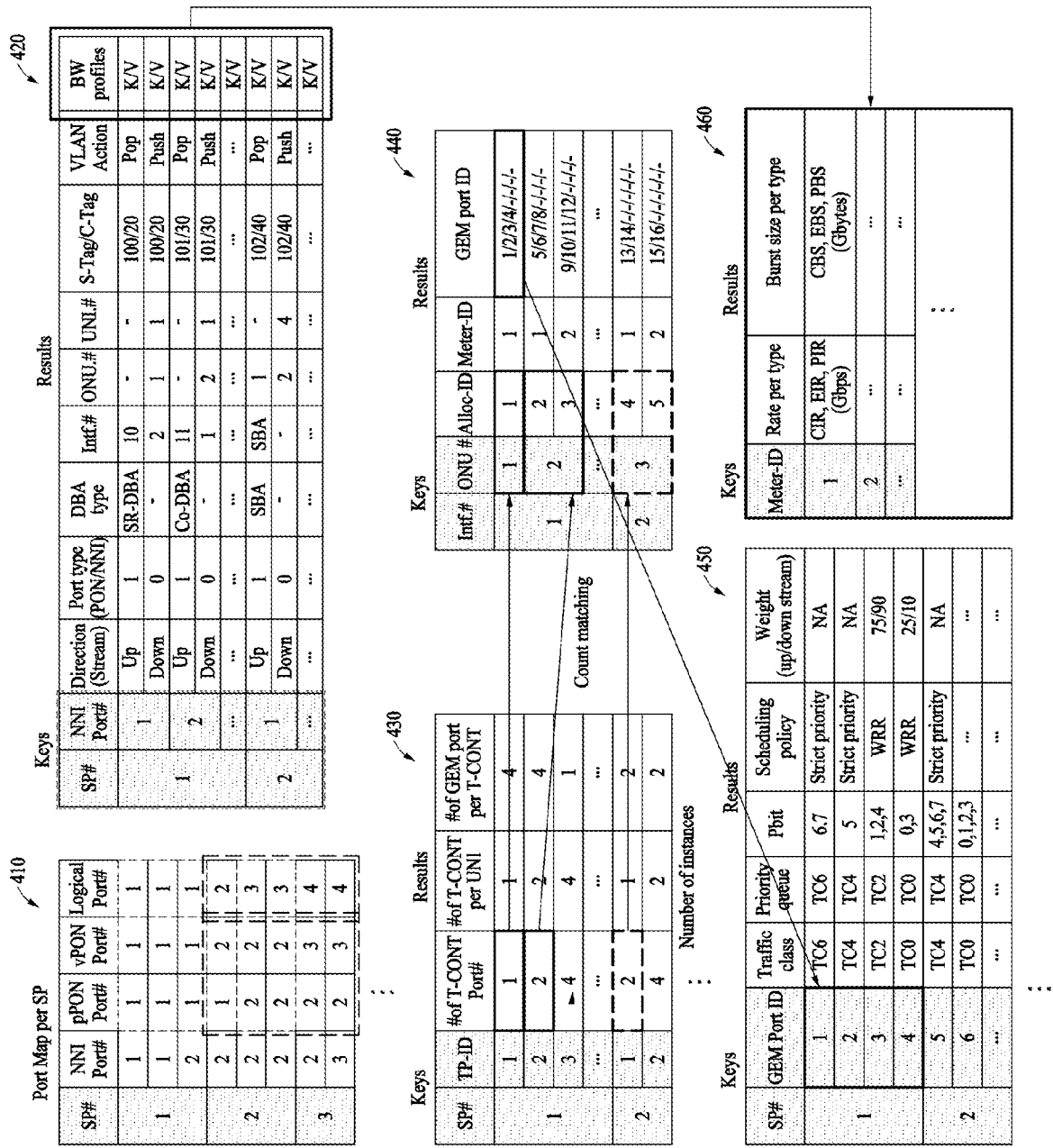
FIG. 4 is a diagram illustrating a lookup table structure of a key/value (K/V) storage used by a PON slicing device according to an example embodiment.

FIG. 4 is a diagram illustrating a lookup table structure of a K/V storage used by a PON slicing device according to an example embodiment.

Reference numeral 410 indicates a lookup table for allocating, by the PON slicing device 100, port mapping of a pPON and a vPON based on an NNI allocated for each SP, and a logical port according to a pPON/vPON mapping result. The lookup table of reference numeral 410 may abstract the pPON as the vPON, perform mapping on the vPON for port setting and management, and then model the vPON as a logical switch, and a DBA configuration and a service attribute may be set according to a service characteristic for each logical port.

Reference numeral 420 indicates a lookup table for generating, by the controller block 111, flow setting information corresponding to each flow ID for each SP. The lookup table of reference numeral 420 may have a service profile ID and flow ID for each SP as a key value for lookup.

In addition, a lookup result for the lookup table of reference numeral 420 may be divided and set according to a direction (upstream/downstream) of a traffic stream, and may have a BP including a port type (PON port (0), NNI port (1)), a DBA type (SBA, SR-DBA, Co-DBA, and the like), an interface ID corresponding to port information set as a PON or an NNI, an ONU ID, a UNI ID, a double tag (S-tag/C-tag) for uniquely identifying a subscriber, a VLAN action, and K/V information of the lookup table.

As such, flow information configured by the controller block 111 may be stored in the K/V storage so that the HW abstraction block 112 generates "Combined Values per flow ID" in the third message 330.

Reference numeral 430 indicates a lookup table for generating a traffic scheduler (T-CONT) and a traffic queue (GEM port) that have an HW attribute for each TP-ID so as to set a TP applied to a PON. The lookup table may have a service profile ID and a TP-ID as a key value for lookup, and a lookup result may have the number of T-CONTs per pONU, the number of T-CONTs per UNI, and the number of GEM ports per T-CONT. As such, configuration information for each TP-ID generated by the HW abstraction block 112 may be transmitted to the controller block 111 and used to update flow ID setting information respectively corresponding to the HW attribute.

Reference numeral 440 indicates a lookup table for obtaining a meter ID with an alloc-ID having HW attribute information of a traffic scheduler and a traffic queue for forwarding of upstream traffic for each service subscriber, the number and IDs of GEM ports, and BP information. The lookup table may have an interface ID and an ONU ID indicating PON port information as a key value for lookup, and a lookup result may have an alloc-ID, the number and IDs of GEM ports belonging to the alloc-ID, a meter ID from which information on traffic policing or shaping is obtainable, and the like. The T-CONT may be identified by the alloc-ID, and the GEM port may be uniquely identified by the GEM port ID.

Reference numeral 450 indicates a lookup table for defining a pOLT and pONU internal traffic priority, a queuing policy, and a scheduling policy to determine a traffic forwarding rule. The lookup table may have an alloc-ID and a GEM port ID obtained from the lookup table of reference numeral 440 as a key value for lookup, and a lookup result may have allocation of a traffic scheduler and a traffic queue, a P-bit mapper, a scheduling policy, a weight of upstream/downstream scheduling, and the like.

Reference numeral 460 indicates a lookup table for defining a service parameter (a minimum rate, a maximum rate, and a guaranteed rate) related to BW allocation. The lookup table may have a meter ID obtained from the lookup table of reference numeral 440 as a key value for lookup, and a lookup result may have an obtained parameter that varies according to a BP type defined in MEF or ITU-T, and may have a BW rate (for example, CIR, EIR, PIR, GIR, and the like) and a burst size (for example, CBS, EBS, PBS, and the like) used for a token bucket.

Figure 5:
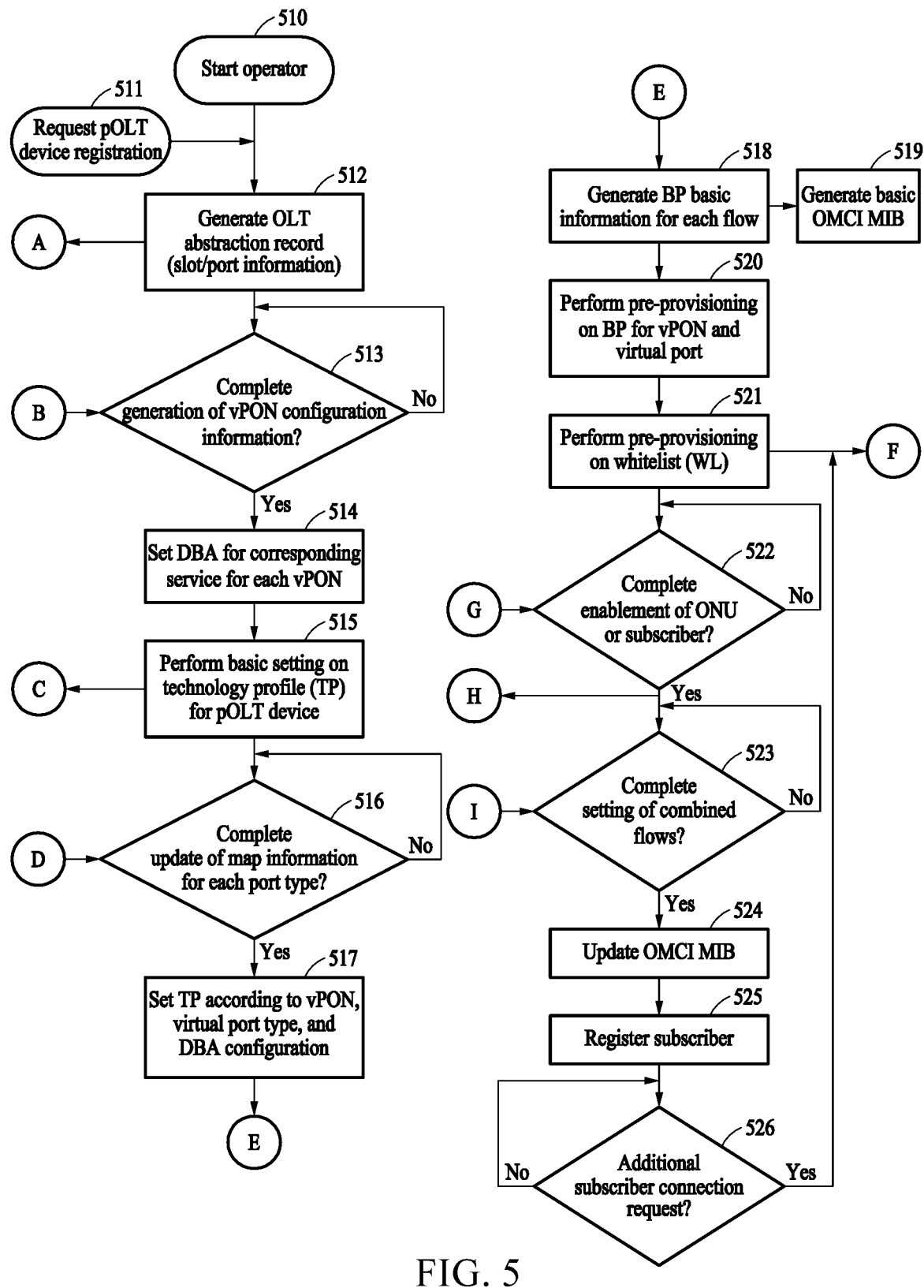
FIG. 5 is a flowchart illustrating an operation of mapping, by an operator, an optical access network infrastructure to a vPON through pPON abstraction, an operation of configuring dynamic bandwidth allocation (DBA) for a corresponding subscriber service for each vPON, and an operation of setting a flow for each subscriber in a PON slicing method according to an example embodiment.

FIG. 5 is a flowchart illustrating an operation of mapping, by an operator, an optical access network infrastructure to a vPON through pPON abstraction, an operation of configuring DBA for a corresponding subscriber service for each vPON, and an operation of setting a flow for each subscriber in a PON slicing method according to an example embodiment.

In operation 510, an operator may start managing the controller block 111 in the control plane 110 through the service orchestration unit 130 so that the PON slicing device 100 performs PON slicing on an optical access network infrastructure for each service.

When the controller block 111 receives a pOLT device registration request after initialization of a pOLT and an integrated switch, which are network elements of the optical access network, is completed in operation 511, the controller block 111 may generate an OLT abstraction record including slot and port information, and then proceed from operation A to operation B in operation 512.

When generation of vPON configuration information is completed from operation B in operation 513, the controller block 111 may set DBA for a corresponding service for each vPON in operation 514.

In operation 515, the HW abstraction block 112 may perform basic setting on a TP including an OLT number for a pOLT device, and a PON technology type (G-PON, XGS-PON, NG-PON2, 25GS-PON, and the like), and then may proceed from operation C to operation D.

When update of information on a map configuration (pOLT number, vOLT number, logical port map, and the like) for each port type is completed from operation D in operation 516, the HW abstraction block 112 may set detailed profile information such as a traffic scheduler and a priority queue according to a vPON, a virtual port type, and a DBA configuration in operation 517.

When a TP-ID is given from operation 517, the controller block 111 may generate basic information on a BP for each flow ID (BW-related service parameter, VLAN information, profile map, and the like) in operation 518, the HW abstraction block 112 may generate basic OMCI MIB information for establishing a data path in a pPON in operation 519.

After operation 518, the controller block 111 may perform pre-provisioning on a BP for a vPON and a virtual port in operation 520. In operation 521, the operator may perform pre-provisioning of a pONU serial number and pOLT PON port information (location information) on a whitelist (WL) database (DB) in the controller block 111 through the service orchestration unit 130, and then may proceed from operation F to operation G.

When an ONU or subscriber is allowed to be enabled from operation G in operation 522, operation I may proceed from operation H. When subscriber flow information setting is completed from operation I in operation 523, OMCI MIB information (alloc-ID, GEM port, P-bit mapper, MAC bridge SP, VLAN tag, and the like) of the HW abstraction block 112 may be updated in operation 524, and then the ONU or subscriber may be registered in operation 525. When there is an additional subscriber connection request in a corresponding service in operation 526, the process from operation F may be repeated.

Figure 6A:
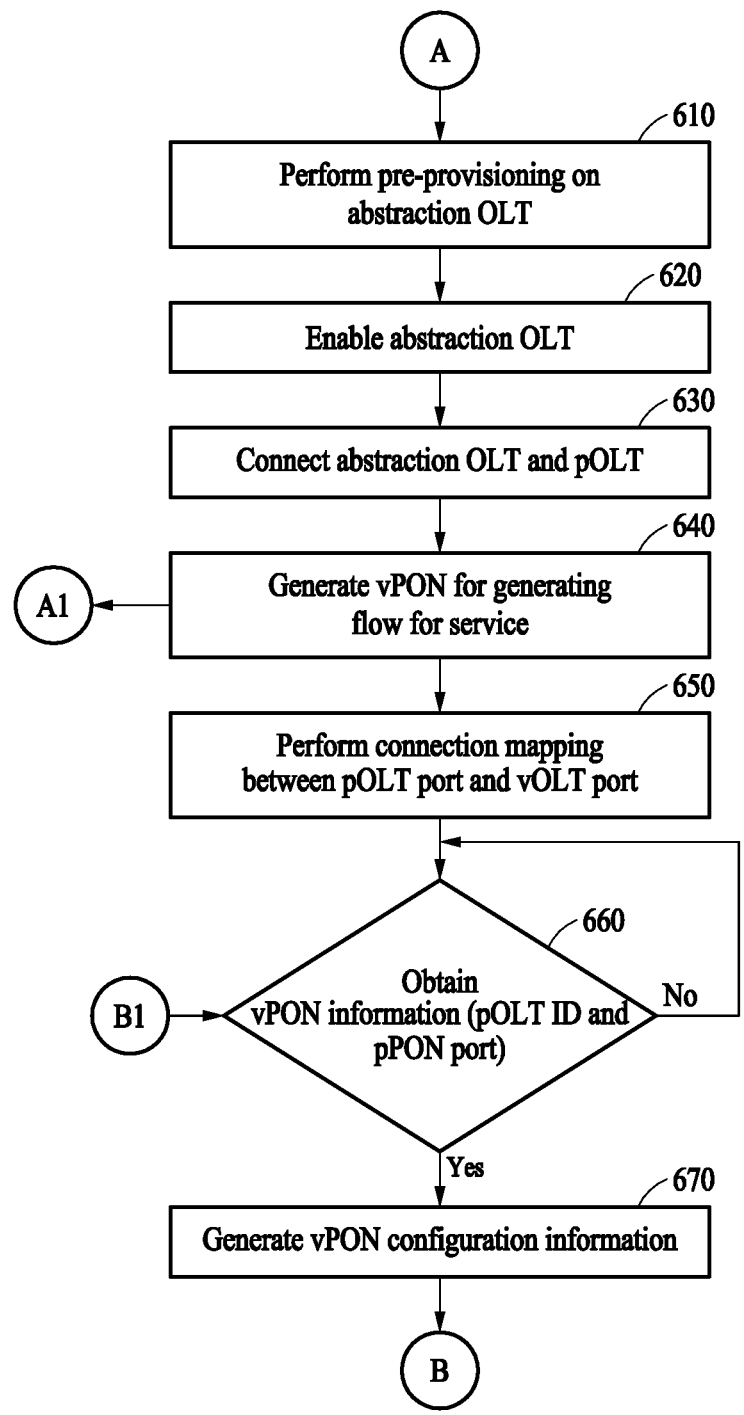
FIGS. 6A and 6B are flowcharts illustrating an operation of mapping an optical access network infrastructure to a vPON through pPON abstraction in a PON slicing method according to an example embodiment.
Figure 6B:
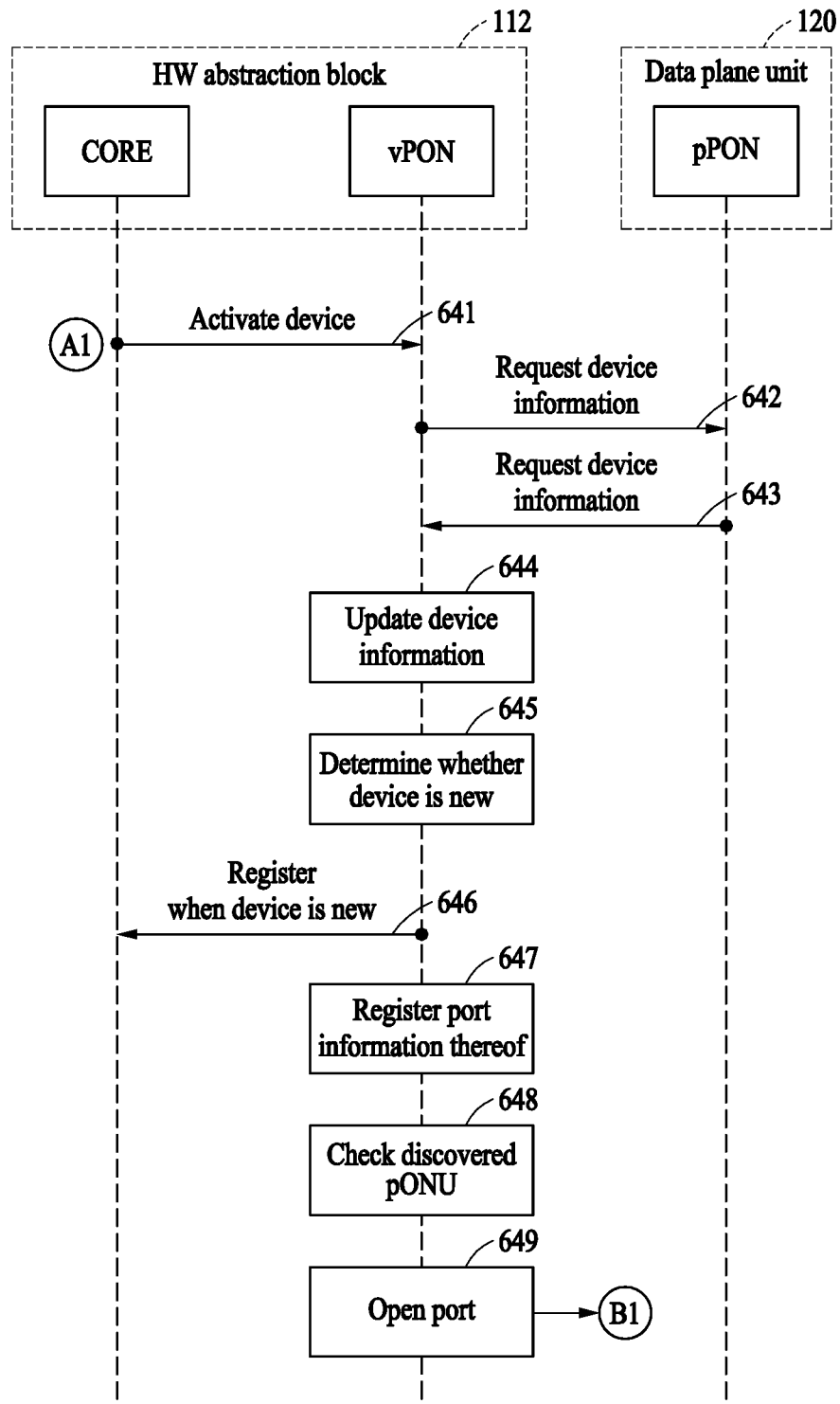

FIGS. 6A and 6B are flowcharts illustrating an operation of mapping an optical access network infrastructure to a vPON through pPON abstraction in a PON slicing method according to an example embodiment. In FIGS. 6A and 6B, for ease of description, an abstraction OLT corresponding to a pOLT has the same concept as that of a vOLT, and thus is used interchangeably with the vOLT.

Referring to FIG. 6A, in operation 610, the HW abstraction block 112 may perform pre-provisioning on the abstraction OLT based on the OLT abstraction record (slot/port) information received from operation 512 of FIG. 5, and may enable the abstraction OLT in operation 620. In operation 630, the HW abstraction block 112 may connect the abstraction OLT and the pOLT. In operation 640, the HW abstraction block 112 may generate a vPON for generating a flow for each service, and then proceed from operation A1 to operation B1.

In operation 650, the HW abstraction block 112 may perform mapping between a pOLT port and a vOLT port, and then await operation B1 to be completed. In operation 660, the HW abstraction block 112 may obtain vPON information such as a pOLT ID and a PON port. In operation 670, the HW abstraction block 112 may generate vPON configuration information using the vPON information obtained in operation 660, and then may transmit, to operation 513 of FIG. 5, the generated vPON configuration information.

Referring to FIG. 6B, after operation 640, a core function of the HW abstraction block 112 may transmit a device activation command to a vPON function in operation 641, and the vPON function of the HW abstraction block 112 may request device information from a pPON of the data plane unit 120 in operation 642. In operation 643, the pPON of the data plane unit 120 may transmit the device information to the vPON of the HW abstraction block 112. In operation 644, the vPON function may update the device information.

In operation 645, the vPON function may check whether a device is new based on the updated device information. When it is identified that the device is new, the vPON function may transmit a registration request command to the core function of the HW abstraction block 112 in operation 646, and may register port information thereof in operation 647.

In this case, in operation 648, the vPON function may check whether there are pONUs connected to the pOLT through a discovery ONU process. For settings of the pOLT and the pONU, in operation 649, the vPON function may open an interface port for communication between the vPON function of the HW abstraction block 112 and the pOLT, and related PON ports between the pOLT and the pONU. Finally, the vPON function may transmit, to operation 660, the device information for vPON configuration.

Figure 7:
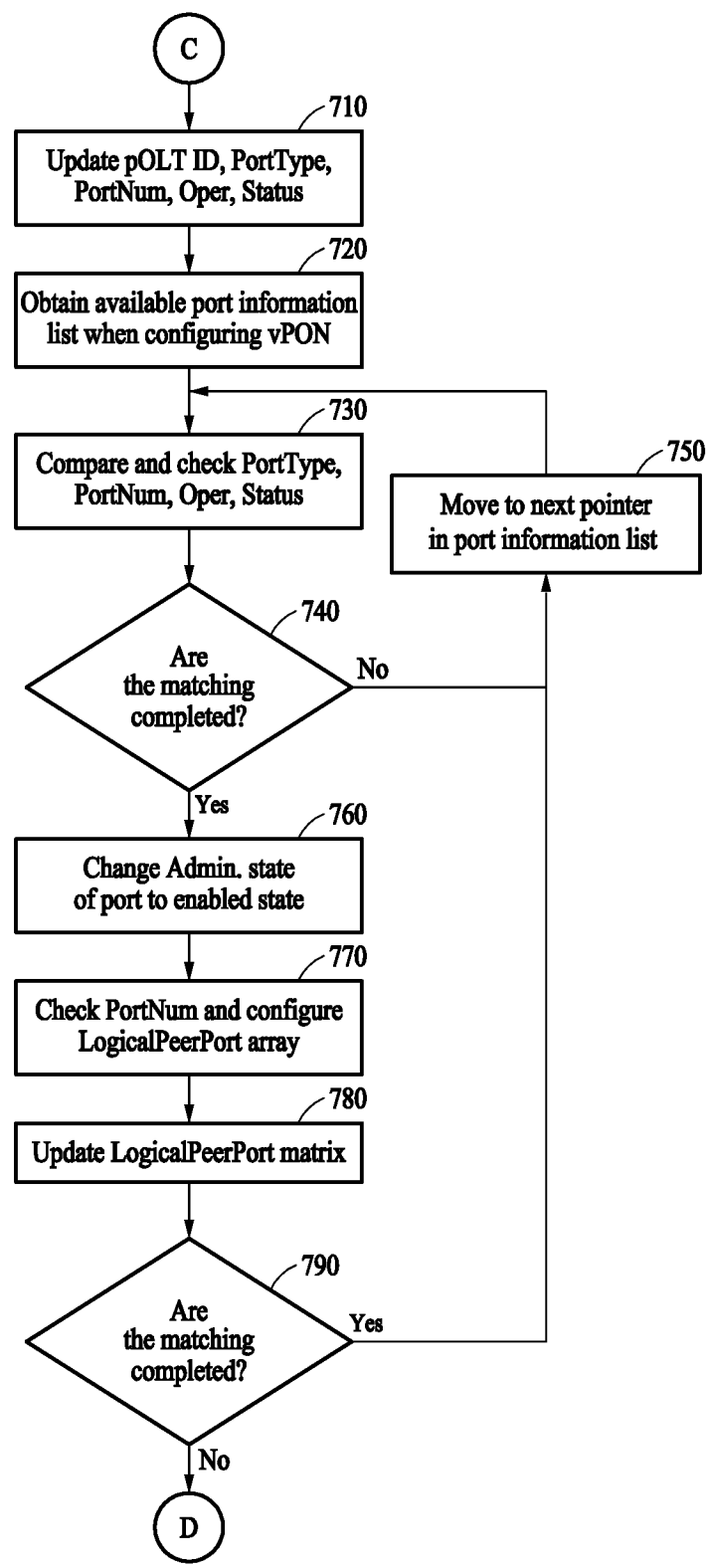
FIG. 7 is a flowchart illustrating an operation of generating a matrix map of a pPON, a vPON, and a logical port in a PON slicing method according to an example embodiment.

FIG. 7 is a flowchart illustrating an operation of generating a matrix map of a pPON, a vPON, and a logical port in a PON slicing method according to an example embodiment.

In operation 710, the HW abstraction block 112 may update, based on the pOLT device (slot/port) information received from operation 515 of FIG. 5, a pOLT ID, a port type for each port, a port number for each port, and an operation status for each port. In operation 720, the HW abstraction block 112 may obtain an available vPON port information list when configuring a vPON based on the OLT abstraction record (slot/port) information received from operation 512 of FIG. 5.

In operation 730, the HW abstraction block 112 may compare and check the port type, the port number, and the operation status for each port between an NNI port including a pPON, a PON port, and an access node interface (ANI) and UNI port, and configuration ports of the vPON obtained from the vPON port information list of operation 720. In operation 740, the HW abstraction block 112 may check whether matching of the pPON and the vPON is completed.

When matching is not completed in operation 740, the HW abstraction block 112 may move to a next pointer in the vPON port information list of operation 720 in operation 750, and then operation 730 may be performed again. Conversely, when matching is completed in operation 740, the HW abstraction block 112 may change an administration state of the matched port to an enabled state in operation 760.

In operation 770, the HW abstraction block 112 may check a port number of the matched port and configure a logical peer port array. In operation 780, the HW abstraction block 112 may update a logical peer port matrix.

In operation 790, the HW abstraction block 112 may check whether an unmatched port remains. When there is an unmatched port, operation 790 may move to operation 750. When matching of all ports are completed, port map information may be transmitted to operation 516 of FIG. 5.

Figure 8A:
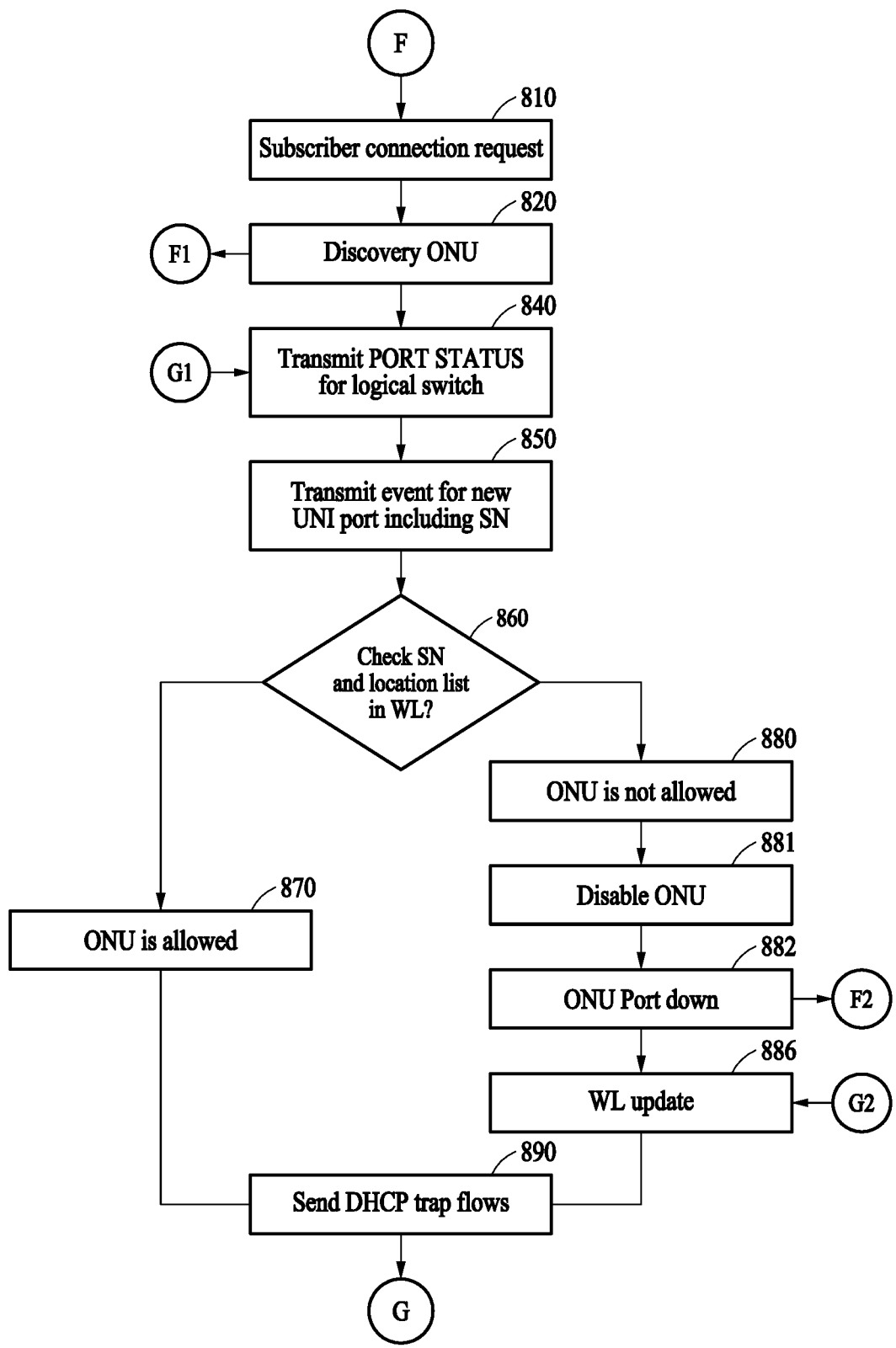
FIGS. 8A to 8C are flowcharts illustrating a physical ONU (pONU) and subscriber registration procedure in a PON slicing method according to an example embodiment.
Figure 8B:
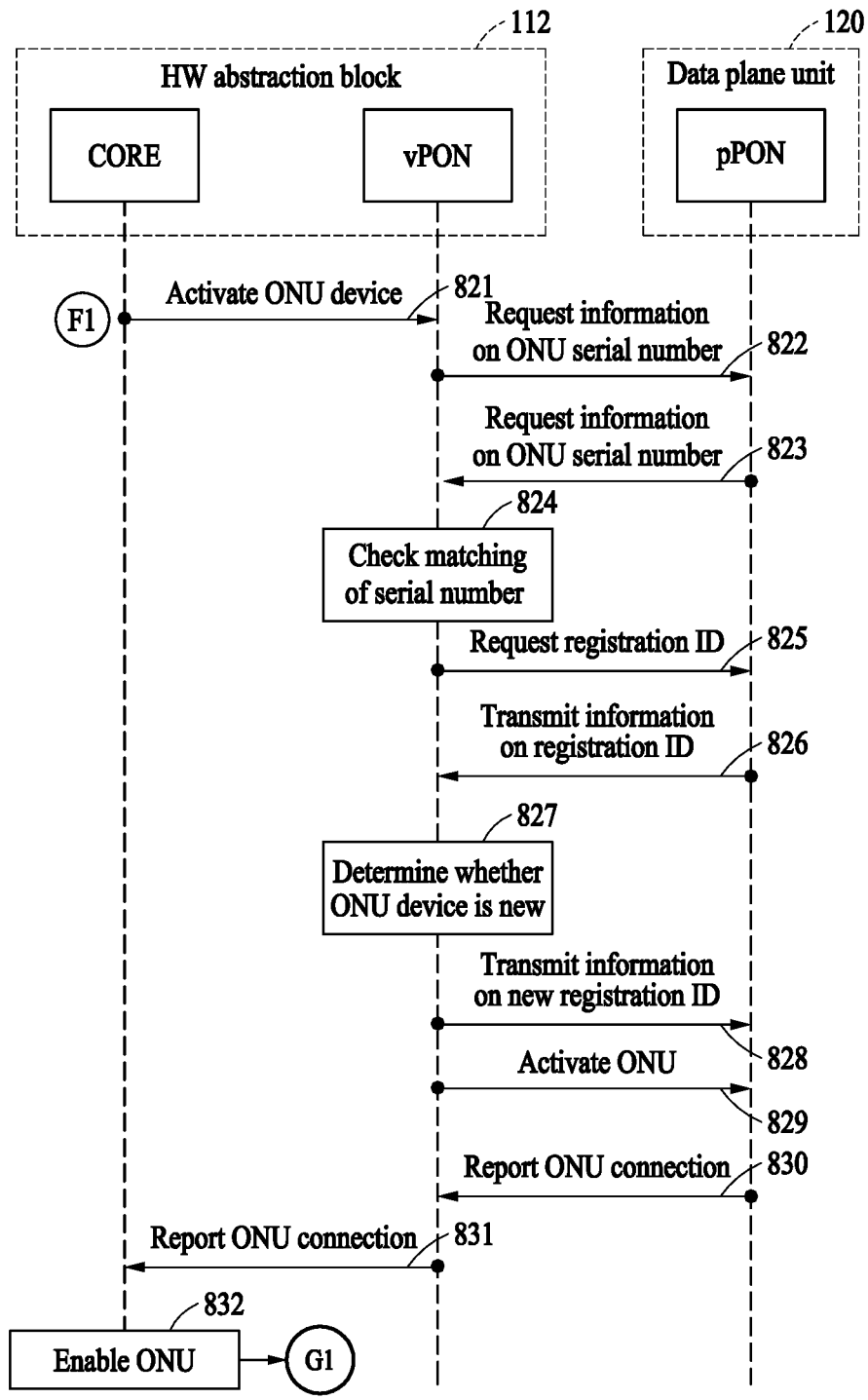
Figure 8C:
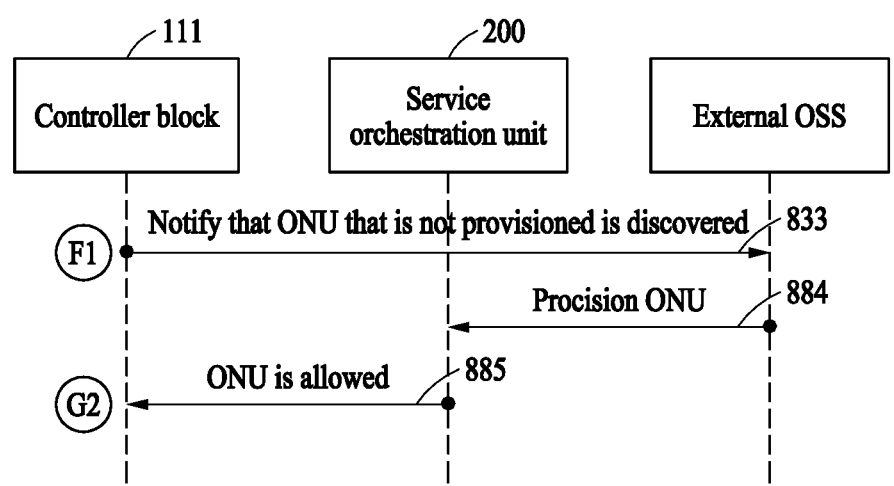

FIGS. 8A to 8C are flowcharts illustrating a pONU and subscriber registration procedure in a PON slicing method according to an example embodiment.

Referring to FIG. 8A, after operation 521 of FIG. 5, when the HW abstraction block 112 receives a subscriber connection request in operation 810, the HW abstraction block 112 may perform a discovery ONU process in operation 820, and then may proceed from operation F1 to operation G1. When a new ONU is discovered, a core function of the HW abstraction block 112 may transmit, to a vPON function, an ONU device activation event in operation 821 of FIG. 8B, and the vPON function of the HW abstraction block 112 may request ONU serial number (SN) information from a pPON of the data plane unit 120 in operation 822.

In operation 823, the pPON of the data plane unit 120 may transmit the ONU SN information to the vPON function of the HW abstraction block 112. In operation 824, the vPON function of the HW abstraction block 112 may perform an SN matching process.

When SN matching is checked, the vPON function of the HW abstraction block 112 may request a registration ID in operation 825, and the pPON of the data plane unit 120 may transmit registration ID information to the vPON function in operation 826.

In operation 827, the vPON function of the HW abstraction block 112 may check whether an ONU device is new. When it is identified that the device is new, the vPON function of the HW abstraction block 112 may transmit new registration ID information to the pPON of the data plane unit in operation 828. In operation 829, the vPON function of the HW abstraction block 112 may activate the ONU. Conversely, when it is identified that the device is not new, the vPON function of the HW abstraction block 112 may directly activate the ONU in operation 829.

In operation 830, the pPON of the data plane unit 120 may report, to the vPON function, that the ONU is connected. In operation 831, the vPON function of the HW abstraction block 112 may report, to the core function, that the ONU is connected.

Then, in operation 832, the core function of the HW abstraction block 112 may enable the ONU. In operation 840 of FIG. 8A, port status information for a logical switch may be transmitted to the controller block 111.

In operation 850, the controller block 111 of the control plane unit 110 may transmit, to the service orchestration unit 130, an event for a new UNI port including SN information. In operation 860, the service orchestration unit 130 may check SN and location information in an ONU WL, and then transmit a notification event to the controller block 111.

When the SN and location information is valid, the ONU may be allowed by the controller block 111 in operation 870, and the controller block 111 may transmit a DCHP trap flow to the HW abstraction block 112 in operation 890.

When the SN and location information is not valid in operation 860, the controller block 111 may not allow the ONU in operation 880, and may transmit, to the HW abstraction block 112, a notification event to disable the ONU in operation 881.

In operation 882, the HW abstraction block 112 may notify the controller block 111 of ONU port down, and may proceed from operation F2 to operation G2.

More specifically, referring to FIG. 8C, in operation 883, the controller block 111 may transmit an event notifying an external OSS that an ONU that is not provisioned is discovered. In operation 884, the external OSS may perform a provisioning ONU process on the service orchestration unit 130. In operation 885, the service orchestration unit 130 may notify the controller block 111 that the ONU is allowed. In operation 886 of FIG. 8A, the controller block 111 may perform ONU WL update. In operation 890, the controller block 111 may transmit the DCHP trap flow to the HW abstraction block 112.

Figure 9:
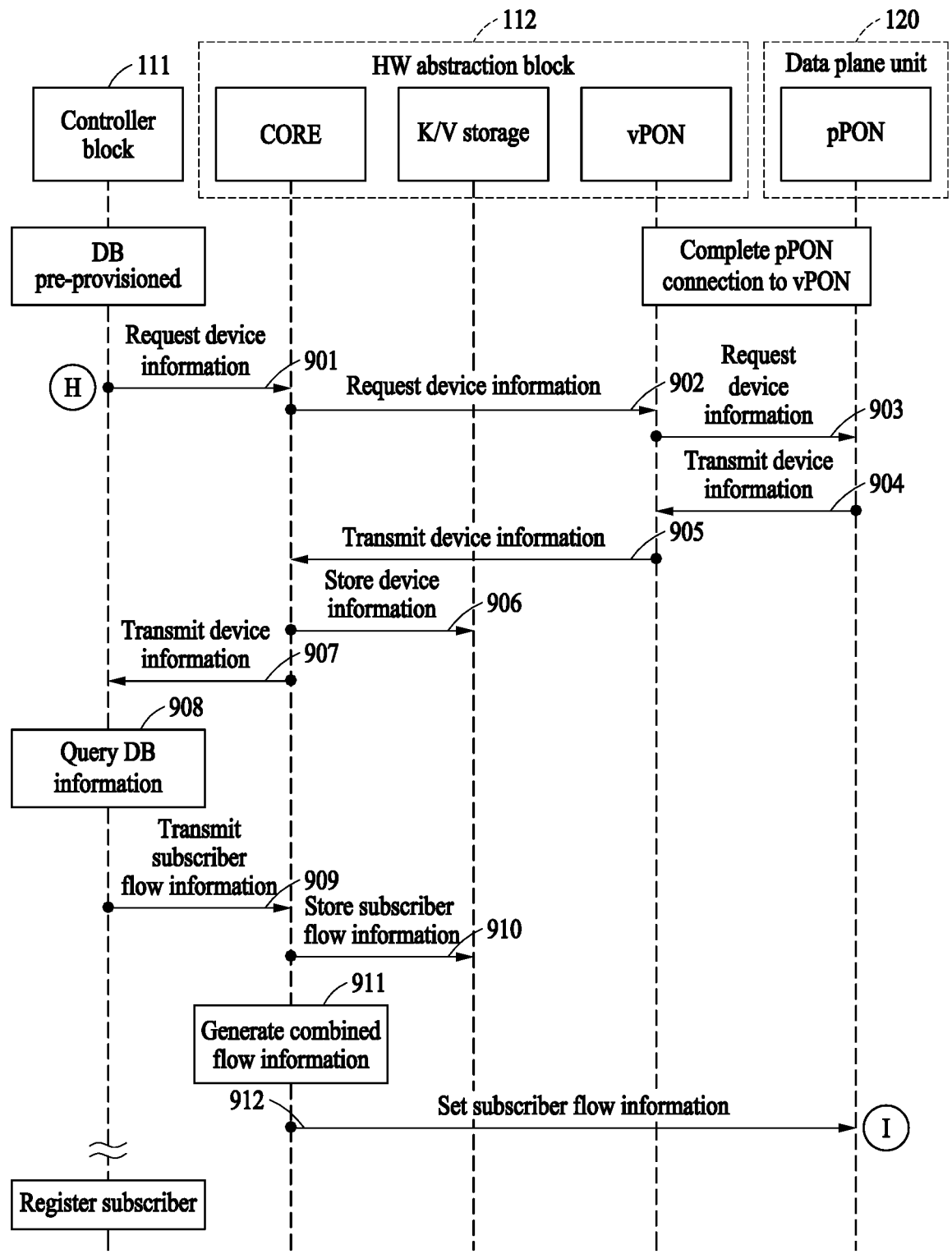
FIG. 9 is a flowchart illustrating an operation of generating combined flow information and an operation of setting of a subscriber flow in a PON slicing method according to an example embodiment.

FIG. 9 is a flowchart illustrating an operation of generating combined flow information and an operation of setting of a subscriber flow in a PON slicing method according to an example embodiment.

When enablement of the ONU or subscriber is completed in operation 522 of FIG. 5, the controller block 111 may request device information from a core function of the HW abstraction block 112 to download subscriber flow setting information.

In operation 902, the core function of the HW abstraction block 112 may request the device information from a vPON function. In operation 903, the vPON function may finally request the device information from a pPON of the data plane unit 120. When the vPON function receives the device information from the data plane unit 120 in operation 904, the vPON function may transmit the device information to the core function in operation 905.

In operation 906, the core function of the HW abstraction block 112 may store the received device information in a K/V storage. In operation 907, the core function of the HW abstraction block 112 may transmit related device information to the controller block 111. In operation 908, the controller block 111 may query a DB using the related device information. In operation 909, subscriber flow information may be transmitted to the core function of the HW abstraction block 112.

In operation 910, the core function of the HW abstraction block 112 may store the subscriber flow information in the K/V storage. In operation 911, the core function of the HW abstraction block 112 may generate combined flow information. In operation 912, the subscriber flow information may be set based on the combined flow information.

Figure 10:
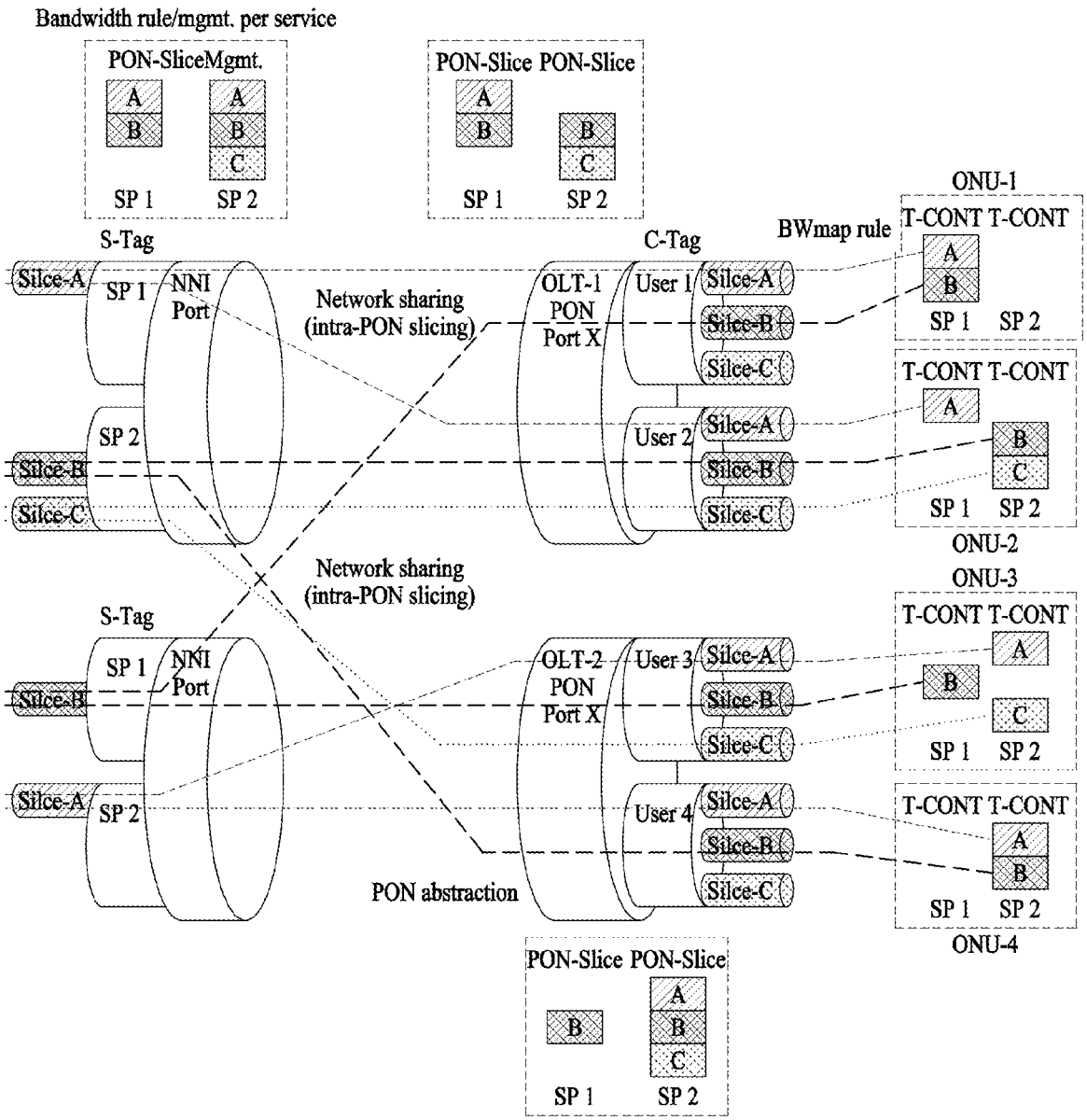
FIG. 10 is a diagram illustrating an example embodiment in which a service provider (SP) shares a network infrastructure to provide a service to subscribers in a PON slicing method, using a simplified forwarding lookup table.

FIG. 10 is a diagram illustrating an example embodiment in which an SP shares a network infrastructure to provide a service to subscribers in a PON slicing method, using a simplified forwarding lookup table.

Referring to FIG. 10, the forwarding lookup table may be managed separately for each SP. When an SP ID is used as a key of the forwarding lookup table, the forwarding lookup table may be shared for each SP.

Although FIG. 10 illustrates only the forwarding lookup table separated for each SP, it is not intended to limit a structure of a forwarding lookup table of an optical access network. The forwarding lookup table is simply illustrated for ease of description.

The components described in the example embodiments may be implemented by hardware components including, for example, at least one digital signal processor (DSP), a processor, a controller, an application-specific integrated circuit (ASIC), a programmable logic element, such as a field programmable gate array (FPGA), other electronic devices, or combinations thereof. At least some of the functions or the processes described in the example embodiments may be implemented by software, and the software may be recorded on a recording medium. The components, the functions, and the processes described in the example embodiments may be implemented by a combination of hardware and software.

The method according to example embodiments may be written in a computer-executable program and may be implemented as various recording media such as magnetic storage media, optical reading media, or digital storage media.

Various techniques described herein may be implemented in digital electronic circuitry, computer hardware, firmware, software, or combinations thereof. The techniques may be implemented as a computer program product, i.e., a computer program tangibly embodied in an information carrier, e.g., in a machine-readable storage device (for example, a computer-readable medium) or in a propagated signal, for processing by, or to control an operation of, a data processing apparatus, e.g., a programmable processor, a computer, or multiple computers. A computer program, such as the computer program(s) described above, may be written in any form of a programming language, including compiled or interpreted languages, and may be deployed in any form, including as a stand-alone program or as a module, a component, a subroutine, or other units suitable for use in a computing environment. A computer program may be deployed to be processed on one computer or multiple computers at one site or distributed across multiple sites and interconnected by a communication network.

Processors suitable for processing of a computer program include, by way of example, both general and special purpose microprocessors, and any one or more processors of any kind of digital computer. Generally, a processor will receive instructions and data from a read-only memory or a random-access memory, or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Examples of information carriers suitable for embodying computer program instructions and data include semiconductor memory devices, e.g., magnetic media such as hard disks, floppy disks, and magnetic tape, optical media such as compact disk read only memory (CD-ROM) or digital video disks (DVDs), magneto-optical media such as floptical disks, read-only memory (ROM), random-access memory (RAM), flash memory, erasable programmable ROM (EPROM), or electrically erasable programmable ROM (EEPROM). The processor and the memory may be supplemented by, or incorporated in special purpose logic circuitry.

In addition, non-transitory computer-readable media may be any available media that may be accessed by a computer and may include both computer storage media and transmission media.

Although the present specification includes details of a plurality of specific example embodiments, the details should not be construed as limiting any invention or a scope that can be claimed, but rather should be construed as being descriptions of features that may be peculiar to specific example embodiments of specific inventions. Specific features described in the present specification in the context of individual example embodiments may be combined and implemented in a single example embodiment. On the contrary, various features described in the context of a single embodiment may be implemented in a plurality of example embodiments individually or in any appropriate sub-combination. Furthermore, although features may operate in a specific combination and may be initially depicted as being claimed, one or more features of a claimed combination may be excluded from the combination in some cases, and the claimed combination may be changed into a sub-combination or a modification of the sub-combination.

Likewise, although operations are depicted in a specific order in the drawings, it should not be understood that the operations must be performed in the depicted specific order or sequential order or all the shown operations must be performed in order to obtain a preferred result. In a specific case, multitasking and parallel processing may be advantageous. In addition, it should not be understood that the separation of various device components of the aforementioned example embodiments is required for all the example embodiments, and it should be understood that the aforementioned program components and apparatuses may be integrated into a single software product or packaged into multiple software products.

The example embodiments disclosed in the present specification and the drawings are intended merely to present specific examples in order to aid in understanding of the present disclosure, but are not intended to limit the scope of the present disclosure. It will be apparent to those skilled in the art that various modifications based on the technical spirit of the present disclosure, as well as the disclosed example embodiments, can be made.

What is claimed is:

1. A passive optical network (PON) slicing method comprising:
    identifying network elements included in a plurality of physical PONs (pPONs);
    abstracting the identified network elements to be recognized as a same software block;
    generating a plurality of virtual PONs (vPONs) according to a user requirement using the plurality of pPONs; and
    mapping the generated plurality of vPONs by performing PON slicing on the abstracted network elements,
    classifying the identified network elements included in the plurality of pPONs into a data plane and a control plane
    classifying the identified network elements included in the plurality of pPONs into a data plane and a control plane,
    wherein the generating comprises generating a plurality of vPONs on the control plane by reconfiguring the abstracted plurality of network elements for each service provider (SP) or each service type provided by the SP,
    wherein an internal message and a transmission frame is managed by the PON slicing device, wherein the internal message is comprised of at least a first message for setting information for each flow ID being managed to provide a specific service of an optical access network included in a vPON for each service provider, a second message for dividing a flow suitable for the vPON after a core function parses technology profile identification (TP-ID) information on number of transmission containers (T-Conts) and GPON encryption method (GEM) ports that are allocated to a TP-ID to obtain flow information and to configure a data path and set flow information, a third message for parsing combined flow information and extracting related pieces of information to set dynamic bandwidth allocation (DBA); and a fourth message for indicating a configuration of a BWmap field message.

2. The PON slicing method of claim 1, further comprising:
transmitting and receiving data through network elements on the data plane mapped to correspond to the generated plurality of vPONs.

3. The PON slicing method of claim 2, wherein the transmitting and receiving comprises allocating a bandwidth (BW) to the plurality of vPONs using different BW allocation schemes for each SP or each service type provided by the SP according to a user requirement using the plurality of vPONs.

4. The PON slicing method of claim 1, wherein
the plurality of pPONs and the plurality of vPONs are matched in N:M, and
N and M are equal or different from each other.

5. A passive optical network (PON) slicing device that performs a PON slicing method, the PON slicing device comprising a processor,
wherein the processor is configured to:
identify network elements included in a plurality of pPONs;
abstract the identified network elements to be recognized as a same software block;
generate a plurality of vPONs according to a user requirement using the plurality of pPONs; and
map the generated plurality of vPONs by performing PON slicing on the abstracted network elements,
wherein the processor is configured to classify the identified network elements included in the plurality of pPONs into a data plane and a control plane,
wherein the processor is configured to generate a plurality of vPONs on the control plane by reconfiguring the abstracted plurality of network elements for each SP or each service type provided by the SP,
wherein an internal message and a transmission frame is managed by the PON slicing device, wherein the internal message is comprised of at least a first message for setting information for each flow ID being managed to provide a specific service of an optical access network included in a vPON for each service provider, a second message for dividing a flow suitable for the vPON after a core function parses technology profile identification (TP-ID) information on number of transmission containers (T-Conts) and GPON encryption method (GEM) ports that are allocated to a TP-ID to obtain flow information and to configure a data path and set flow information, a third message for parsing combined flow information and extracting related pieces of information to set dynamic bandwidth allocation (DBA); and a fourth message for indicating a configuration of a BWmap field message.

6. The PON slicing device of claim 5, wherein the processor is configured to transmit and receive data through network elements on the data plane mapped to correspond to the generated plurality of vPONs.

7. The PON slicing device of claim 6, wherein the processor is configured to allocate a BW to the plurality of vPONs using different BW allocation schemes for each SP or each service type provided by the SP according to a user requirement using the plurality of vPONs.

8. The PON slicing device of claim 5, wherein
the plurality of pPONs and the plurality of vPONs are matched in N:M, and
N and M are equal or different from each other.

9. A passive optical network (PON) slicing method comprising:
configuring PON slices with parameters;
setting parameters for multiple dynamic bandwidth allocation (DBA) for an optical line terminal (OLT); and
setting the DBA for each PON slices,
wherein an internal message and a transmission frame is managed by a PON slicing device, wherein the internal message is comprised of at least a first message for setting information for each flow ID being managed to provide a specific service of an optical access network included in a vPON for each service provider, a second message for dividing a flow suitable for the vPON after a core function parses technology profile identification (TP-ID) information on number of transmission containers (T-Conts) and GPON encryption method (GEM) ports that are allocated to a TP-ID to obtain flow information and to configure a data path and set flow information, a third message for parsing combined flow information and extracting related pieces of information to set the DBA; and a fourth message for indicating a configuration of a BWmap field message.

* * * * *